United States Patent [19]
Harris

[11] Patent Number: 5,234,022
[45] Date of Patent: Aug. 10, 1993

[54] FLOW CONTROL VALVE

[75] Inventor: Robert S. Harris, Connersville, Ind.

[73] Assignee: Stant Manufacturing Inc., Connersville, Ind.

[21] Appl. No.: 959,153

[22] Filed: Oct. 9, 1992

[51] Int. Cl.⁵ ............................................. F16K 17/24
[52] U.S. Cl. ..................................... 137/498; 137/43; 137/587
[58] Field of Search ......................... 137/43, 498, 587

[56]  References Cited
U.S. PATENT DOCUMENTS

| 4,456,029 | 6/1984 | McCrum | 137/498 |
| 4,953,583 | 9/1990 | Szlaga | 137/118 |
| 5,028,244 | 7/1991 | Szlaga | 55/170 |
| 5,116,257 | 5/1992 | Szlaga | 137/43 |
| 5,156,178 | 10/1992 | Harris | 137/43 |

OTHER PUBLICATIONS

Prior Art Engineering Drawing Showing an AC-Rochester Manifold Vacuum Actuated Vent Valve Assembly (undated).

Primary Examiner—Robert G. Nilson
Attorney, Agent, or Firm—Barnes & Thornburg

[57] ABSTRACT

An apparatus is provided for controlling discharge of fuel vapor from the fuel tank. The apparatus comprises a housing defining an interior region, an assembly for defining an outer and an inner flow passageway for fuel vapor in the interior region, an assembly for selectively blocking flow of fuel vapor through the outer flow passageway, the blocking assembly being movable between an unblocking position and a blocking position, and an assembly for yieldably biasing the blocking assembly toward the unblocking position.

17 Claims, 2 Drawing Sheets

FLOW CONTROL VALVE

BACKGROUND AND SUMMARY OF THE INVENTION

The present invention relates to tank venting systems and particularly to devices for controlling discharge of fuel vapor from a vehicle fuel tank. More particularly, the present invention relates to tank venting devices for limiting the discharge of fuel vapor from vehicle fuel tanks under high tank pressure conditions.

It has long been appreciated in the design of vehicle fuel systems that it is desirable to provide devices which vent fuel vapor from the vehicle fuel tank at a relatively high flow rate to maintain acceptable levels of fuel vapor pressure in the vehicle fuel tank. Fuel systems engineers have experimented with a wide variety of valve structures to accomplish proper fuel vapor venting. In general, these devices open to allow fuel vapor to vent from the fuel tank over a range of vehicle fuel tank pressures during normal vehicle operation. The devices then close to prevent fuel vapor venting from the fuel tank during, for example, the refueling process. In many of these devices, it is the pressure of the fuel vapor itself which opens the device to allow fuel vapor venting. See, for example, U.S. Pat. Nos. 5,116,257; 5,028,244; and 4,953,583.

Vacuum-actuated tank venting devices are also known. When the engine is running during normal vehicle operation, the resultant vacuum might be used to actuate the venting device to allow fuel vapor venting. See, for example, U.S. patent application Ser. No. 07/660,340, relating to a vacuum-actuated vent assembly.

Regardless of the specific internal structure of the venting device, fuel vapor vented through a venting device typically is directed to a vapor recovery canister or the like. The vapor recovery canister is normally a canister filled with activated carbon or other suitable adsorbent material. Fuel vapor discharged from the fuel tank through the venting device is adsorbed onto the activated carbon, and the exit air stream is vented to the atmosphere. When the engine is operating, the engine may withdraw adsorbed fuel vapor from the activated carbon for subsequent use.

One problem with the use of a vapor recovery canister in conjunction with a tank venting device is that at excessively high fuel vapor flow rates, fuel vapor may tend to overload or otherwise disrupt the operation of the vapor recovery canister. That is, the flow rate of fuel vapor entering the vapor recovery canister may become so high that some amount of fuel vapor may pass through the vapor recovery canister to the atmosphere without becoming adsorbed onto the activated carbon bed and trapped in the canister. In addition, as the engine operates to withdraw fuel vapor from the vapor canister, an overloaded canister may cause the engine to withdraw an excessive amount of fuel vapor, resulting in an undesirably rich fuel/air mixture being introduced into the engine and adversely affecting engine performance.

The problem of overloading the vapor recovery canister with fuel vapor is exacerbated, of course, by the continued efforts to develop venting devices which are configured to vent larger and larger volumes of fuel vapor from the fuel tank to the vapor recovery canister in response to higher and higher pressure levels in the tank. It is thus an object of the present invention to provide an apparatus for controlling the discharge of fuel vapor from a vehicle fuel tank which limits the venting of fuel vapor at pressures higher than a predetermined pressure to avoid overloading the vapor recovery canister with excess fuel vapor.

A fuel vapor venting assembly that is configured to reduce the amount of fuel vapor that is vented from the fuel tank to the vapor recovery canister as the tank pressure rises would be an improvement over conventional tank venting assemblies. What is needed is a tank venting valve that is operable to vent fuel vapor from a tank during normal operating conditions so as to maintain proper tank pressure levels and that is able automatically to step down the flow rate of fuel vapor that is discharged from the tank to the canister as soon as the tank pressure rises to a predetermined level so as to prevent the canister from being overloaded with fuel vapor during high pressure conditions in the tank.

According to the present invention, an apparatus is provided for controlling discharge of fuel vapor from the fuel tank. The apparatus includes a housing defining an interior region, means for defining an outer and an inner flow passageway for fuel vapor in the interior region, and means for selectively blocking flow of fuel vapor through the outer flow passageway. The blocking means is moveable between an unblocking position and a blocking position. The apparatus also includes means for yieldably biasing the blocking means toward the unblocking position.

In preferred embodiments, the apparatus is a multi-stage valve assembly that operates automatically to maximize discharge of fuel vapor from a tank to a canister at low tank pressures and to limit the amount of fuel vapor that is discharged to the canister once the tank pressure rises above a predetermined level. Advantageously, the improved multi-stage valve assembly reduces tank exhaust vapor flow at relatively high tank pressures to prevent canister saturation and possible engine operating problems.

The multi-stage valve assembly includes a vent channel formed to include a small inner flow passageway and a larger annular outer flow passageway surrounding the inner flow passageway. The assembly also includes a valve disk that is movable relative to the vent channel and is formed to include an orifice aligned with the inner flow passageway. Essentially, at low tank pressure, the valve disk is located away from the vent channel to permit fuel vapor in the tank to pass through the valve disk orifice, and then through both of the inner and outer flow passageways into a plenum that is connected to the canister. By using both flow passageways a large volume of fuel vapor can be discharged to the canister at low tank pressure. However, once the tank pressure rises to exceed the predetermined level, the valve disk moves automatically to engage the vent channel and block any further discharge of fuel vapor through the larger annular outer flow passageway. Advantageously, by limiting the amount of fuel vapor discharged from the tank to that amount which is able to pass through the orifice in the valve disk and the small inner flow passageway, the assembly prevents overloading of the canister with fuel vapor.

In the illustrated embodiment, the housing is formed to include an inlet for receiving fuel vapor in the interior region from the fuel tank and an outlet for discharging fuel vapor from the interior region to a vapor recovery device. The defining means cooperates with the housing to define an annular space to provide the outer flow passageway. The defining means is also formed to include the inner flow passageway. The blocking means is formed to include a high flow orifice allowing passage of fuel vapor therethrough. The blocking means is movable in the interior region in response to fuel vapor pressure. When positioned in the unblocking position, the blocking means is out of engagement with the defining means, allowing the fuel vapor passing through the high flow orifice to enter and pass through both of the inner and outer flow passageways. When positioned in the blocking position, the blocking means is in engagement with the defining means, allowing fuel vapor passing through the orifice to enter and pass through only the inner flow passageway to reduce the flow of fuel vapor to the vapor recovery device.

Advantageously, then, the present invention steps down the flow of fuel vapor to the vapor recovery device when the fuel tank pressure exceeds a predetermined level. This reduces the potential for overloading the vapor recovery device with fuel vapor and for providing an excessively rich fuel/air mixture to the engine.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying figures in which.

DETAILED DESCRIPTION OF THE INVENTION

Figure 1:
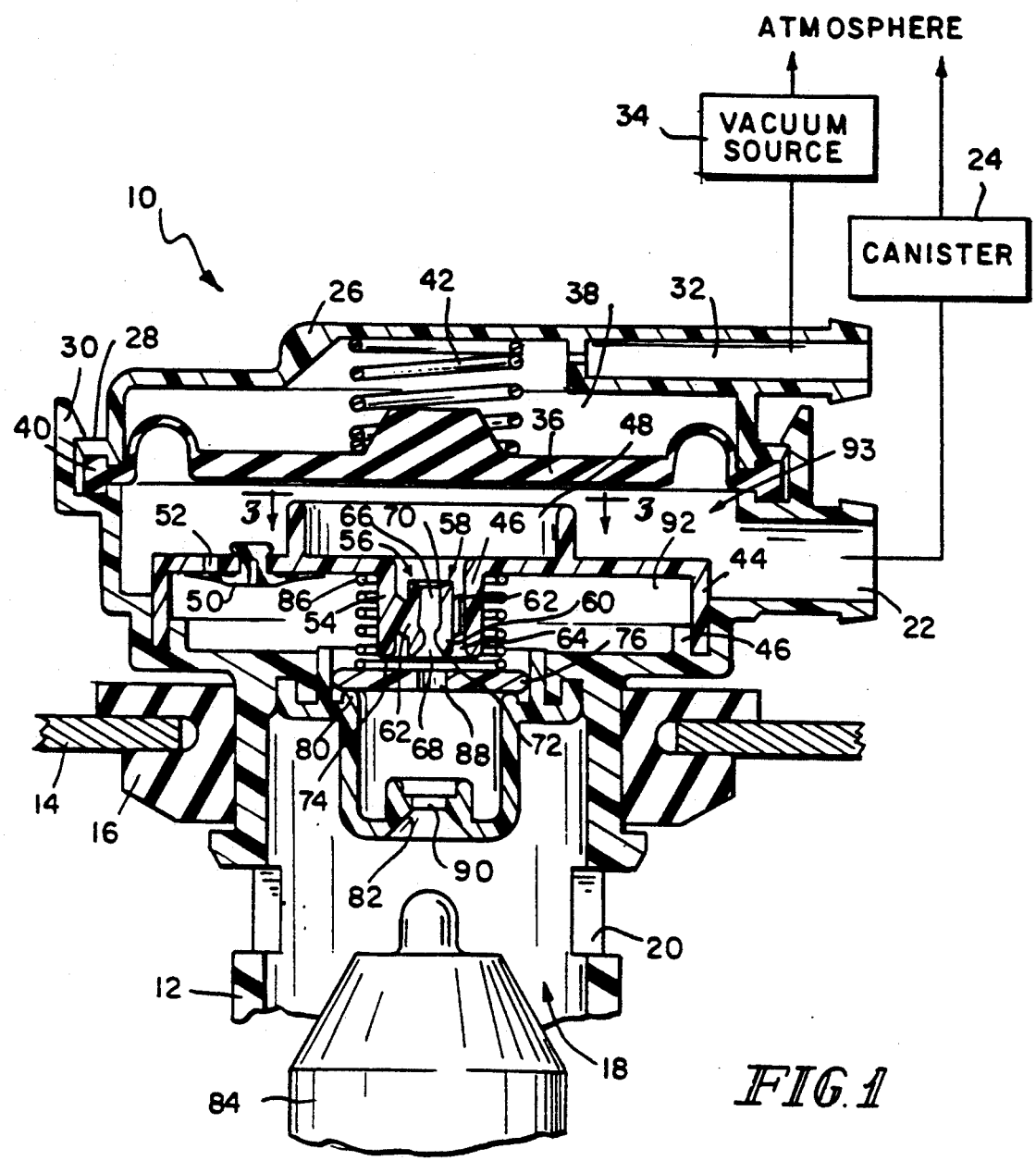
FIG. 1 is a partial sectional view of an apparatus in accordance with the present invention showing a valve member moved to its unblocking position to allow fuel vapor venting through both the inner and outer flow passageways during operation of the vehicle at relatively low to normal fuel vapor pressures.

A preferred embodiment of an apparatus in accordance with the present invention is illustrated in FIG. 1. As shown in FIG. 1, an apparatus 10 in accordance with the present invention includes a housing 12 extending through an aperture formed in a top wall 14 of a fuel tank. A gasket 16 sealingly engages housing 12 to hold housing 12 in place and to prevent the escape of fuel vapors. Housing 12 defines an interior region 18. Housing 12 is formed to include an inlet 20 positioned to receive fuel vapor from the fuel tank. Housing 12 is also formed to include an outlet port 22 for discharging fuel vapor from interior region 18 to a canister 24 or other suitable collection device.

Figure 3:
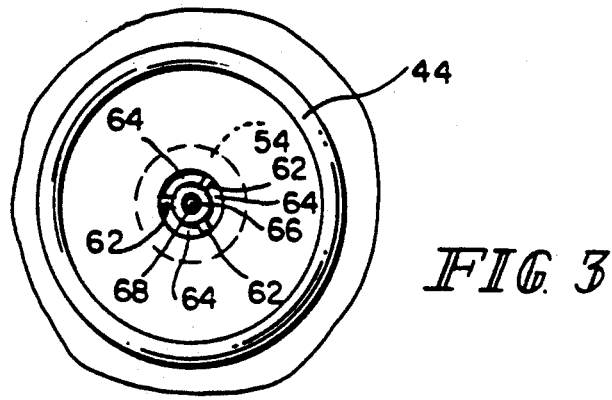
FIG. 3 is a partial sectional view taken along lines 3—3 in FIG. 1 showing the flow baffle defining the inner and outer flow passageways for fuel vapor venting.

As shown, interior region 18 is bordered at its upper end by a cap 26 which snap fits onto housing 12 by way of a flange 28 which mates with an upstanding tang 30. Cap 26 may be formed to include a vacuum port 32 for connection to a vacuum source 34. It will be appreciated that although the embodiment of FIGS. 1-3 operate through a connection to vacuum source 34, alternative embodiments having no connection to a vacuum source are contemplated as within the scope of the present invention.

A diaphragm 36 extends across an upper portion of interior region 18, cooperating with cap 26 to define a control chamber 38. A peripheral edge 40 of diaphragm 36 is sandwiched between flange 28 and tang 30. A spring 42 or other biasing means biases diaphragm 36 away from cap 26. Vacuum from vacuum source 34 applied to control chamber 38 through vacuum port 32 actuates diaphragm 36 for movement as will be described below.

An insert 44 is positioned in interior region 18 near diaphragm 36. A flange 46 projecting into interior region 18 holds insert 44 in place. Insert 44 includes a circular support 48 which serves as a stop for diaphragm 36. Insert 44 also includes an umbrella type relief valve 50 positioned to normally cover a relief opening 52. Relief valve 50 provides vacuum relief to the fuel tank during tank vacuum conditions as will be subsequently described.

Insert 44 further includes a downwardly extending cylindrical wall 54 defining a central passageway 56. Fuel vapor from the fuel tank entering interior region 18 through inlet 20 travels through central passageway 56 eventually passing through outlet port 22 to canister 24.

A flow baffle 58 is positioned in central passageway 56. Flow baffle 58 includes a body 60 and a plurality of ribs 62 shown best in FIG. 3. Ribs 62 extend between body 60 and cylindrical wall 54 so that body 60 is held in generally spaced apart relationship with cylindrical wall 54. The outer surface of body 60 cooperates with the inner surface of cylindrical wall 54 to define an annular space 64. Annular space 64 provides an outer flow passageway for fuel vapor passing through central passageway 56. Central passageway 56, in cooperation with flow baffle 58, thus provides means for establishing the annular outer flow passageway as defined by annular space 64.

Body 60 of flow baffle 58 is formed to include an inner passageway 66. A low flow orifice 68 provides an inlet for fuel vapor to pass into inner passageway 66, and an exit orifice 70 provides an outlet for fuel vapor exiting inner passageway 66 and reentering central passageway 56. Advantageously, low flow orifice 68 has a relatively small diameter to serve as a restriction on the flow of venting fuel vapor during high tank pressure conditions as will be subsequently described. The term "low flow orifice" as used herein refers to a flow orifice whose diameter is small relative to other flow orifices in the same vicinity. It is not meant to imply any particular range of diameters or flow rates unless otherwise specified.

Flow baffle 58 thus provides means for establishing inner flow passageway 66 for fuel vapor passing through central passageway 56. As shown, inner passageway 66 is of fairly constant diameter along the majority of its length, and its diameter rapidly decreases to the diameter of orifice 68 only near the lower end of inner passageway 66. It is also within the contemplation of the present invention to provide an inner passageway 66 which decreases in diameter gradually from exit orifice 70 to low flow orifice 68. Indeed, a wide variety of internal geometries for inner passageway 66 might be used, depending upon the flow restriction sought. Typically, the diameter of low flow orifice 68 will be about 0.060 inch (1.524 mm), while the diameter of orifice 70 is likely to be about 0.1 inch (2.54 mm) (a 3:5 ratio of diameters).

Body 60 includes a valve seat 72 at the lower end thereof near orifice 68. Cylindrical wall 54 likewise includes a valve member 76 moves to seat against both valve seats 72 and 74 when the fuel vapor pressure in the fuel tank rises to above a predetermined level as will be subsequently described.

A foundation 78 is affixed in interior region 18 to support valve member 76. Foundation 78 includes a valve seat 80 on which valve member 76 rests when the fuel vapor pressure in the fuel tank is below the predetermined level. Foundation 78 also includes a valve seat 82 for a rollover valve 84 as will be subsequently described. Seat 82 borders an opening 90.

Figure 2:
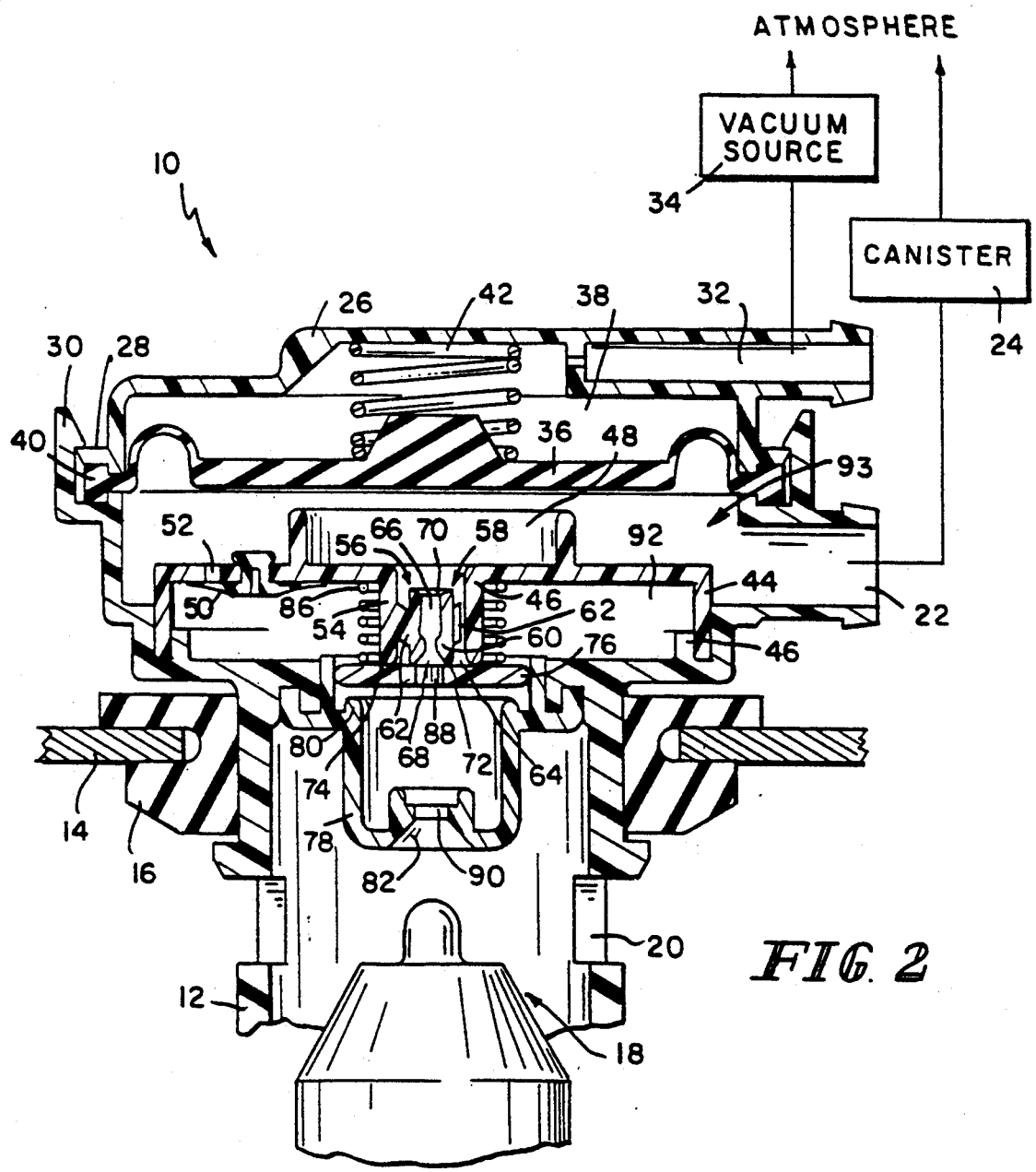
FIG. 2 is a partial sectional view of the apparatus of FIG. 1 showing the valve member moved to its blocking position allowing fuel vapor venting only through the inner flow passageways during vehicle operation under relatively high tank pressures.

Valve member 76 is preferably a resilient disk or, alternatively, a rigid disk having an elastomeric coating. A spring 86 normally biases valve member 76 into sealing engagement with valve seat 80. Valve member 76 can move in response to fuel vapor pressure received in interior region 18 from the fuel tank between an unblocking position seated against valve seat 80 as shown in FIG. 1 and a blocking position seated against both valve seats 72 and 74 as shown in FIG. 2. Valve member 76 and spring 86 thus cooperate with flow baffle 58 and with cylindrical wall 54 to provide a flow-metering assembly for selectively reducing flow of fuel vapor to vapor recovery canister 34 when the fuel vapor pressure in the fuel tank exceeds a predetermined level.

Valve member 76 is formed to include a high flow orifice 88 through which fuel vapor must pass before it reaches central passageway 56. The diameter of orifice 88 is approximately equal to the diameter of orifice 70 in the illustrated embodiment, but this relationship is not required. The term "high flow orifice" is employed to indicate that the orifice has a relatively large diameter compared to other orifices in proximity to it. It is not necessarily meant to imply a specific range of flow rates or of diameters unless otherwise specified.

Rollover valve 84 may be any of a number of rollover valves, either of the float type, the ball and ramp type, or other commonly available designs. One rollover valve particularly suited for use in connection with the present invention is described in U.S. Pat. No. 5,028,244, relevant portions of which are hereby incorporated by reference.

The operation of apparatus 10 during normal operation of the vehicle at relatively low to normal tank pressures is illustrated in FIG. 1. As shown, valve member 76 is biased by spring 86 to its unblocking position out of engagement with flow baffle 58 and seated in sealing engagement with valve seat 80. Fuel vapor from the fuel tank passes into interior region 18 through inlet 20 and passes through opening 90 to impinge against valve member 76. The fuel vapor pressure is low to normal, so the force of the fuel vapor acting against valve member 76 is insufficient to overcome the opposing biasing force of spring 86. Valve member 76 thus remains seated on valve seat 80. Fuel vapor can, of course, pass through high flow orifice 88. Some fuel vapor will then pass through low flow orifice 68 into inner flow passageway 66, eventually leaving inner flow passageway 66 by way of exit orifice 70. Fuel vapor can also pass through the outer flow passageway defined by annular space 64, flowing generally about the periphery of body 60 of flow baffle 58 around ribs 62.

Advantageously, flow baffle 58 is designed so as to be "transparent" in this condition. That is, the combined area available for flow though inner passageway 66 and annular space 64 is much greater than the diameter of high flow orifice 88, such that flow baffle 58 provides essentially no restriction to flow. Thus, apparatus 10 is capable of providing generally unrestricted venting of relatively large volumes of fuel vapor during normal vehicle operation at low to normal tank pressures. An incidental amount of fuel vapor is likely to accumulate in chamber 92, but will not affect the function of the device.

Fuel vapor exiting exit orifice 70 and annular space 64 can pass through the flow plenum 93 beneath diaphragm 36 to outlet port 22 and eventually to vapor recovery canister 24. During vehicle operation, diaphragm 36 is normally in the illustrated position away from circular support 52 so that fuel vapor exiting exit orifice 70 and annular space 64 can pass to outlet port 22. The engine may provide vacuum source 34 applied through vacuum port 32 to draw diaphragm 36 away from circular support 52 against the bias of spring 42. It will be appreciated that diaphragm 36 can be omitted entirely from apparatus 10, or, if included, can be actuated by means other than by vacuum. Such means could include the force exerted by the venting fuel vapor, for example, or a variety of other means.

Operation of apparatus 10 during vehicle operation where tank pressure exceeds a predetermined level is illustrated in FIG. 2. Here, fuel vapor entering interior region 18 through inlet 20 and passing through opening 90 impinges upon valve member 76 with a force sufficient to overcome the biasing force of spring 86. The force is sufficient to move valve member 76 from its unblocking position to its blocking position. In the blocking position, valve member 76 sealingly engages both upper valve seats 72 and 74. Thus, fuel vapor passing through high flow orifice 88 is prevented from entering annular space 64 and flowing therethrough. Fuel vapor passing through high flow orifice 88 can only enter low flow orifice 68 and flow through inner passageway 66 to exit orifice 70, from which it passes through outlet port 22 to reach vapor recovery canister 24.

Because the fuel vapor is forced to pass through low flow orifice 68, and is prevented from flowing through annular space 64, the overall flow of fuel vapor to vapor recovery canister 24 is reduced, thereby reducing the potential for overloading canister 24 with excess fuel vapor.

In other words, valve member 76 cooperates with flow baffle 58 to provide a two stage flow decreasing construction. By the movement of valve member 76 from the unblocking position to the blocking position in response to a predetermined level of fuel vapor pressure in the fuel tank, flow of fuel vapor is metered so as to avoid overloading canister 24, thus avoiding problems such as canister short-circuiting and engine problems arising from canister saturation. As fuel vapor pressure decreases, of course, valve member 76 is returned to the unblocking position under the force of spring 86.

Advantageously, apparatus 10 approximates a constant flow device at low to normal pressures, but provides a rapid flow step-down at a predetermined pressure. As pressure continues to gradually rise above the predetermined pressure, flow likewise gradually rises, such that apparatus 10 again begins to approximate a constant flow device. Thus, it is anticipated that the flow profile for apparatus 10 under typical operation would show flow gradually increasing with pressure to a predetermined pressure at which valve member 76 would move to the blocking position as illustrated in FIG. 2. At this predetermined pressure, flow would sharply decrease, followed by a continued gradual increase of flow with increasing pressure as valve member 76 resumes its unblocking position as illustrated FIG. 1.

Although the invention has been described in detail with reference to certain preferred embodiments, variations and modifications exist within the scope and spirit of the invention as described and defined in the following claims.

I claim:

1. An apparatus for controlling discharge of fuel vapor from a fuel tank, the apparatus comprising
   a housing communicating with the fuel tank and defining an interior region, the housing being formed to include an inlet for receiving fuel vapor in the interior region from the fuel tank and an outlet for discharging fuel vapor from the interior region to a vapor recovery device,
   a flow baffle positioned in the interior region in spaced-apart relationship with the housing to define an annular space providing an outer flow passageway, the flow baffle being formed to include an inner flow passageway and a low flow orifice communicating fuel vapor to the inner flow passageway orifice,
   a valve member formed to include a high flow orifice having a diameter greater than that of the low flow orifice, the valve member being movable in the interior region in response to fuel vapor pressure between an unblocking position out of engagement with the flow baffle so that fuel vapor passing through the high flow orifice flows along both the inner and outer flow passageways and a blocking position engaging the flow baffle so that fuel vapor flowing through the high flow orifice flows only through the inner flow passageway to reduce the flow of fuel vapor to the vapor recovery device, and
   means for yieldably biasing the valve member toward the unblocking position.

2. The apparatus of claim 1, wherein the housing includes a lower valve seat and a first upper valve seat, the valve member being positioned in sealing engagement with the lower valve seat when in the unblocking position and being positioned in sealing engagement with the first upper valve seat when positioned in the blocking position.

3. The apparatus of claim 2, wherein the flow baffle includes a second upper valve seat bordering the low flow orifice and the valve member sealingly engages the second upper valve seat when the valve member is positioned in the blocking position.

4. The apparatus of claim 1, wherein the flow baffle includes a valve seat bordering the low flow orifice and the valve member sealingly engages the valve seat when the valve member is positioned in the blocking position.

5. The apparatus of claim 1, wherein the valve member is a flexible disc.

6. The apparatus of claim 1, wherein the ratio of the diameter of the low flow orifice to the diameter of the high flow orifice is about 3:5.

7. The apparatus of claim 1, wherein the flow baffle is formed to include an exit orifice for the internal passageway and the diameter of the exit orifice is approximately equal to the diameter of the high flow orifice.

8. An apparatus for controlling discharge of fuel vapor from a fuel tank, the apparatus comprising
   a housing communicating with the fuel tank and defining an interior region, the housing being formed to include an inlet for receiving fuel vapor in the interior region from the fuel tank and an outlet for discharging fuel vapor from the interior region to a vapor recovery device,
   means for defining an outer and an inner flow passageway for fuel vapor flowing through the interior region, the defining means cooperating with the housing to define an annular space providing the outer flow passageway, the defining means being formed to include the inner flow passageway,
   means for selectively blocking flow of fuel vapor through the outer flow passageway, the blocking means being formed to include a high flow orifice allowing passage of fuel vapor therethrough, the blocking means being movable in response to fuel vapor pressure in the interior region between an unblocking position out of engagement with the defining means allowing fuel vapor passing through the high flow orifice to enter the outer and inner flow passageways, and a blocking position in engagement with the defining means allowing fuel vapor passing through the high flow orifice to enter only the inner flow passageway to reduce flow of fuel vapor to the vapor recovery device, and
   means for yieldably biasing the blocking means toward the unblocking position.

9. The apparatus of claim 8, wherein the housing includes a lower valve seat and a first upper valve seat, the blocking means being positioned in sealing engagement with the lower valve seat when in the unblocking position and being positioned in sealing engagement with the first upper valve seat when positioned in the blocking position.

10. The apparatus of claim 9, wherein the defining means includes a second upper valve seat and the blocking means includes a valve member positioned in sealing engagement with the second upper valve seat when the blocking means is positioned in its blocking position.

11. The apparatus of claim 8, wherein the defining means includes a valve seat and the blocking means includes a valve member sealingly engaging the valve seat when the blocking means is positioned in the blocking position.

12. The apparatus of claim 8, wherein the blocking means includes a valve member formed as a flexible disc and the high flow orifice is formed in the flexible disc.

13. The apparatus of claim 8, wherein the defining means is formed to include a low flow orifice communicating fuel vapor to the inner flow passageway and the ratio of the diameter of the low flow orifice to the diameter of the high flow orifice is about 3:5.

14. An apparatus for controlling discharge of fuel vapor from a fuel tank, the apparatus comprising
   a housing communicating with the fuel tank and defining an interior region, the housing being formed to include an inlet for receiving fuel vapor in the interior region from the fuel tank and an outlet for discharging fuel vapor from the interior region to a vapor recovery device, a flow-metering assembly positioned in the interior region to reduce flow of fuel vapor through the interior region in response to fuel vapor pressure in the fuel tank in excess of a predetermined amount, the flow-metering assembly including first means for establishing an inner flow passageway for fuel vapor flowing through the interior region, second means for establishing an annular outer flow passageway concentric with the inner passageway for fuel vapor flowing through the interior region, means for selectively blocking flow of fuel vapor through the outer flow passageway to reduce the flow of fuel vapor discharged to the vapor recovery device at fuel vapor pressures above a predetermined pressure, the blocking means being movable in the interior region between an unblocking position and a blocking position, and means for yieldably biasing the blocking means toward the unblocking position.

15. The apparatus of claim 13, wherein the blocking means includes a valve member formed as a flexible disc and a high flow orifice is formed in the flexible disc to allow passage of fuel vapor therethrough.

16. The apparatus of claim 15, wherein the first establishing means is formed to include a low flow orifice communicating fuel vapor to the inner flow passageway and the ratio of the diameter of the low flow orifice to the diameter of the high flow orifice is about 3:5.

17. The apparatus of claim 14, wherein the first establishing means includes a first upper valve seat, the second establishing means includes a second upper valve seat, and the blocking means sealingly engages the first and the second upper valve seats when moved to the blocking position.

* * * * *